(12) United States Patent
Traut et al.

(10) Patent No.: US 9,552,297 B2
(45) Date of Patent: Jan. 24, 2017

(54) METHOD AND APPARATUS FOR EFFICIENT CACHE READ AHEAD

(71) Applicants: Zachary David Traut, Denver, CO (US); Michael David Barrell, Superior, CO (US)

(72) Inventors: Zachary David Traut, Denver, CO (US); Michael David Barrell, Superior, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 295 days.

(21) Appl. No.: 13/952,733

(22) Filed: Jul. 29, 2013

(65) Prior Publication Data

US 2014/0250268 A1    Sep. 4, 2014

Related U.S. Application Data

(60) Provisional application No. 61/772,266, filed on Mar. 4, 2013.

(51) Int. Cl.
*G06F 13/00* (2006.01)
*G06F 12/08* (2016.01)

(52) U.S. Cl.
CPC ....... *G06F 12/0862* (2013.01); *G06F 12/0866* (2013.01); *G06F 2212/6026* (2013.01)

(58) Field of Classification Search
CPC ...................................................... G06F 12/00
See application file for complete search history.

(56) References Cited

U.S. PATENT DOCUMENTS

| 5,381,528 | A | 1/1995 | Brunelle |
| 5,410,653 | A | 4/1995 | Macon, Jr. et al. |
| 5,522,054 | A | 5/1996 | Gunlock et al. |
| 5,557,767 | A | 9/1996 | Sukegawa |
| 5,600,817 | A | 2/1997 | Macon, Jr. et al. |
| 5,619,723 | A | 4/1997 | Jones et al. |
| 5,640,530 | A | 6/1997 | Beardsley et al. |

(Continued)

OTHER PUBLICATIONS

Notice of Allowance dated Oct. 17, 2014 for U.S. Appl. No. 13/482,314.

(Continued)

*Primary Examiner* — Henry Tsai
*Assistant Examiner* — Juanito Borromeo
(74) *Attorney, Agent, or Firm* — Thomas J. Lavan

(57) ABSTRACT

A method for providing improved sequential read performance in a storage controller is provided. In response to the storage controller receiving a host read request from a host computer, the method includes identifying, by the storage controller, a largest burst length of a plurality of burst lengths in a memory of the storage controller, and determining a maximum number of consecutive times between bursts having a value less than a predetermined value. A burst includes a consecutive group of sequential host read requests from the same host computer. The method also includes multiplying the largest burst length of the plurality of burst lengths by the maximum number of consecutive times between bursts having a value less than the predetermined value to obtain an effective burst length and reading into a storage controller cache memory at least the effective burst length of data from storage devices coupled to the storage controller.

20 Claims, 13 Drawing Sheets

(56) References Cited

U.S. PATENT DOCUMENTS

| | | |
|---|---|---|
| 5,680,573 A | 10/1997 | Rubin et al. |
| 5,687,389 A | 11/1997 | Packer |
| 5,809,560 A | 9/1998 | Schneider |
| 6,047,359 A | 4/2000 | Fouts |
| 6,070,230 A | 5/2000 | Capps |
| 6,092,141 A | 7/2000 | Lange |
| 6,092,149 A | 7/2000 | Hicken et al. |
| 6,108,764 A | 8/2000 | Baumgartner et al. |
| 6,195,727 B1 | 2/2001 | Islam et al. |
| 6,226,713 B1 | 5/2001 | Mehrotra |
| 6,249,804 B1 | 6/2001 | Lam |
| 6,286,080 B1 | 9/2001 | Galbraith et al. |
| 6,321,300 B1 | 11/2001 | Ornes et al. |
| 6,338,115 B1 | 1/2002 | Galbraith et al. |
| 6,349,326 B1 | 2/2002 | Lam |
| 6,505,268 B1 | 1/2003 | Schultz et al. |
| 6,523,086 B1 | 2/2003 | Lee |
| 6,549,977 B1 | 4/2003 | Horst et al. |
| 6,567,892 B1 | 5/2003 | Horst et al. |
| 6,701,413 B2 | 3/2004 | Shirai et al. |
| 6,775,794 B1 | 8/2004 | Horst et al. |
| 6,785,771 B2 | 8/2004 | Ash et al. |
| 6,789,171 B2 | 9/2004 | Desai et al. |
| 6,842,792 B2 | 1/2005 | Johnson et al. |
| 6,877,065 B2 | 4/2005 | Galbraith et al. |
| 6,910,099 B1 | 6/2005 | Wang et al. |
| 6,915,404 B1 | 7/2005 | Desai et al. |
| 6,931,486 B2 | 8/2005 | Cavallo et al. |
| 6,965,966 B1 | 11/2005 | Rothberg et al. |
| 7,069,354 B2 | 6/2006 | Pooni et al. |
| 7,080,208 B2 | 7/2006 | Ashmore et al. |
| 7,120,753 B2 | 10/2006 | Accapadi et al. |
| 7,146,467 B2 | 12/2006 | Bearden et al. |
| 7,149,824 B2 * | 12/2006 | Johnson ......................... 710/35 |
| 7,216,203 B1 | 5/2007 | Bagewadi |
| 7,260,679 B2 | 8/2007 | Benhase et al. |
| 7,302,530 B2 | 11/2007 | Barrick et al. |
| 7,318,142 B2 | 1/2008 | Accapadi et al. |
| 7,337,262 B2 | 2/2008 | Beeston et al. |
| 7,493,450 B2 | 2/2009 | Bearden |
| 7,523,259 B2 | 4/2009 | Pistoulet |
| 7,543,124 B1 | 6/2009 | Accapadi et al. |
| 7,627,714 B2 | 12/2009 | Ash et al. |
| 7,664,785 B2 | 2/2010 | Kano |
| 7,721,043 B2 | 5/2010 | Gill et al. |
| 7,724,568 B2 | 5/2010 | Arya et al. |
| 7,779,174 B2 * | 8/2010 | Lee et al. ......................... 710/35 |
| 7,853,751 B2 | 12/2010 | Manoj |
| 7,996,623 B2 | 8/2011 | Walker |
| 8,074,020 B2 | 12/2011 | Seaman et al. |
| 8,255,627 B2 | 8/2012 | Blinick et al. |
| 8,356,126 B2 | 1/2013 | Ashmore |
| 8,478,945 B2 | 7/2013 | Ash et al. |
| 8,700,854 B2 | 4/2014 | Ash et al. |
| 8,788,742 B2 | 7/2014 | Benhase et al. |
| 8,788,755 B2 | 7/2014 | Satran et al. |
| 8,799,571 B1 | 8/2014 | DesRoches et al. |
| 8,806,122 B2 | 8/2014 | Benhase et al. |
| 2002/0069322 A1 | 6/2002 | Galbraith et al. |
| 2003/0041214 A1 | 2/2003 | Hirao et al. |
| 2003/0200404 A1 * | 10/2003 | Wicki et al. .................. 711/156 |
| 2003/0225977 A1 | 12/2003 | Desai et al. |
| 2004/0205298 A1 | 10/2004 | Bearden et al. |
| 2004/0205299 A1 | 10/2004 | Bearden |
| 2005/0021879 A1 | 1/2005 | Douglas |
| 2005/0060495 A1 | 3/2005 | Pistoulet |
| 2005/0071596 A1 | 3/2005 | Aschoff et al. |
| 2005/0235108 A1 | 10/2005 | Hiratsuka |
| 2005/0235125 A1 | 10/2005 | Accapadi et al. |
| 2006/0020759 A1 | 1/2006 | Barrick et al. |
| 2006/0069876 A1 | 3/2006 | Bansal et al. |
| 2006/0248278 A1 | 11/2006 | Beeston et al. |
| 2006/0248387 A1 | 11/2006 | Nicholson et al. |
| 2006/0288186 A1 | 12/2006 | Accapadi et al. |
| 2007/0005904 A1 | 1/2007 | Lemoal et al. |
| 2007/0239747 A1 | 10/2007 | Pepper |
| 2007/0276993 A1 | 11/2007 | Hiratsuka |
| 2008/0005481 A1 | 1/2008 | Walker |
| 2009/0219760 A1 | 9/2009 | Arya et al. |
| 2010/0016283 A1 | 1/2010 | Bernstein et al. |
| 2010/0169283 A1 | 7/2010 | Atluri et al. |
| 2010/0208385 A1 | 8/2010 | Toukairin |
| 2011/0145508 A1 | 6/2011 | Pelleg et al. |
| 2012/0047548 A1 | 2/2012 | Rowlands et al. |
| 2012/0144123 A1 | 6/2012 | Aronovich et al. |
| 2013/0326149 A1 | 12/2013 | Barrell |
| 2014/0181415 A1 | 6/2014 | Loh et al. |
| 2014/0258638 A1 | 9/2014 | Traut et al. |
| 2014/0351527 A1 | 11/2014 | Traut et al. |
| 2015/0169449 A1 | 6/2015 | Barrell et al. |
| 2015/0169450 A1 | 6/2015 | Traut et al. |

OTHER PUBLICATIONS

Notice of Allowance dated Oct. 30, 2014 for U.S. Appl. No. 14/465,291.

Notice of Allowance dated Nov. 7, 2014 for U.S. Appl. No. 14/465,291.

\* cited by examiner

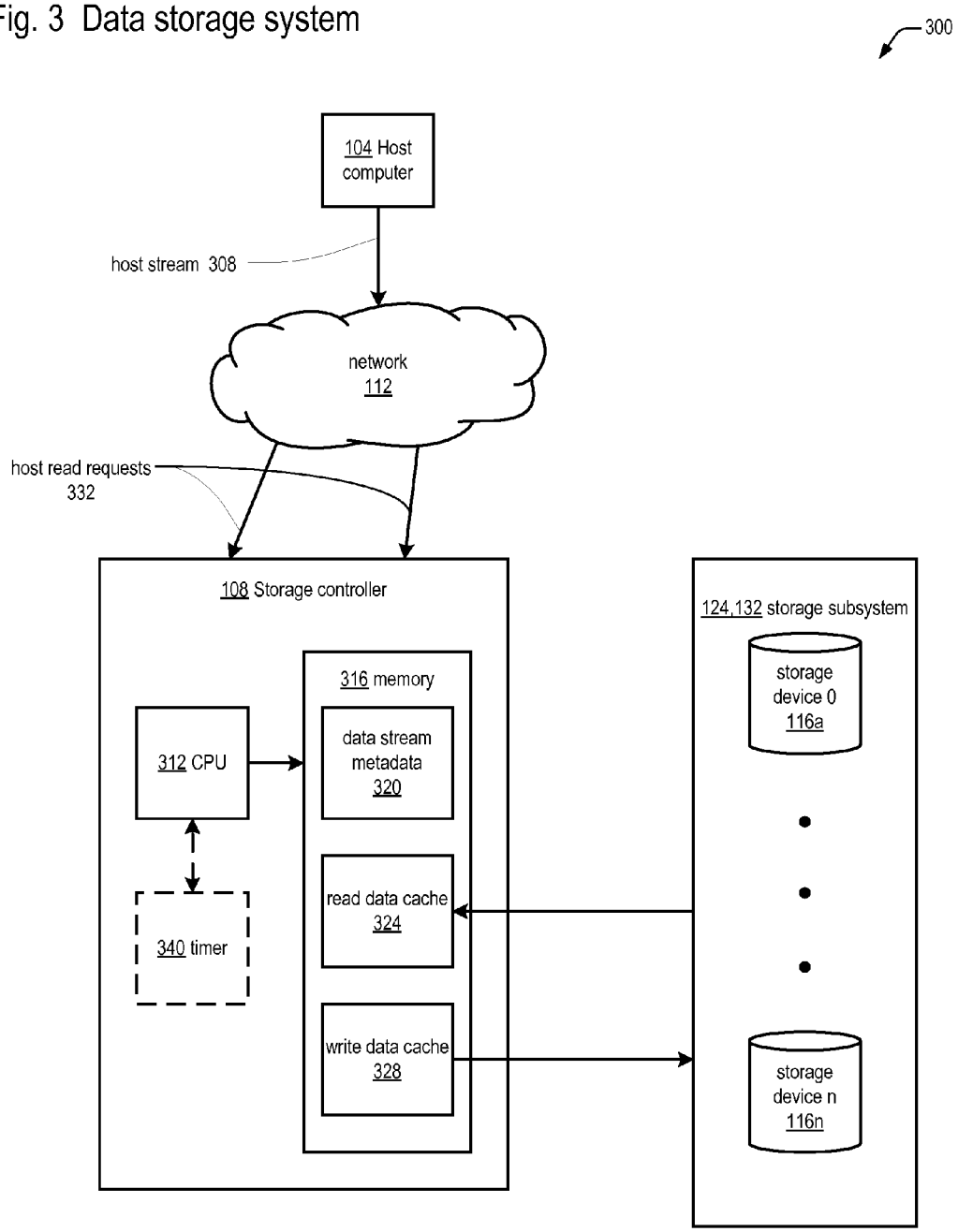

Fig. 4  Host data stream
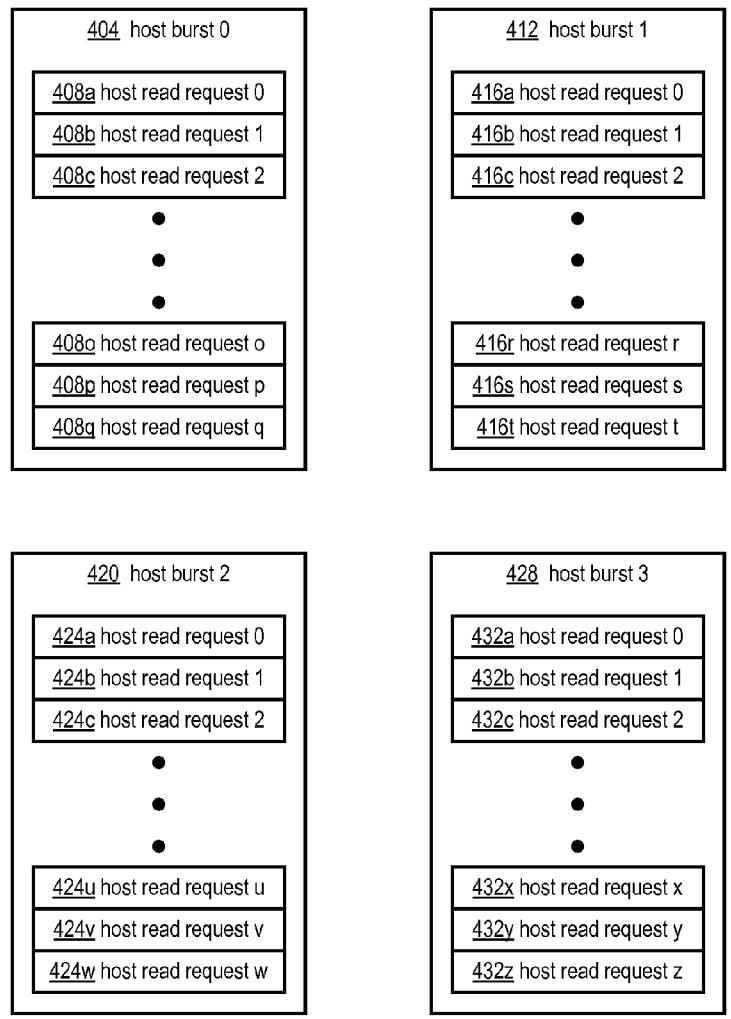
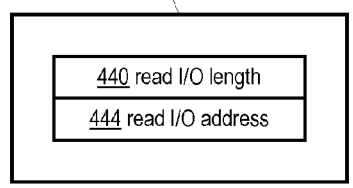

Fig. 5a data stream example
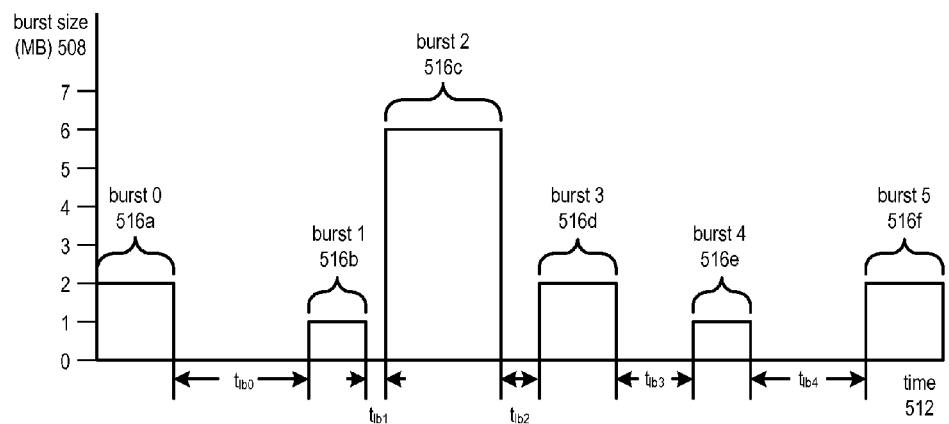
Fig. 5b burst parameters
| | burst 516 | | | | | | | | | |
|---|---|---|---|---|---|---|---|---|---|---|
| | burst 0 516a | | burst 1 516b | | burst 2 516c | | burst 3 516d | | burst 4 516e | | burst 5 516f |
| burst length 520 | 2 MB | | 1 MB | | 6 MB | | 2 MB | | 1 MB | | 2 MB |
| time since last burst ($t_{lb}$) 524 | | 200 ms | | 30 ms | | 60 ms | | 120 ms | | 200 ms | |
←time→

Fig. 6 metadata
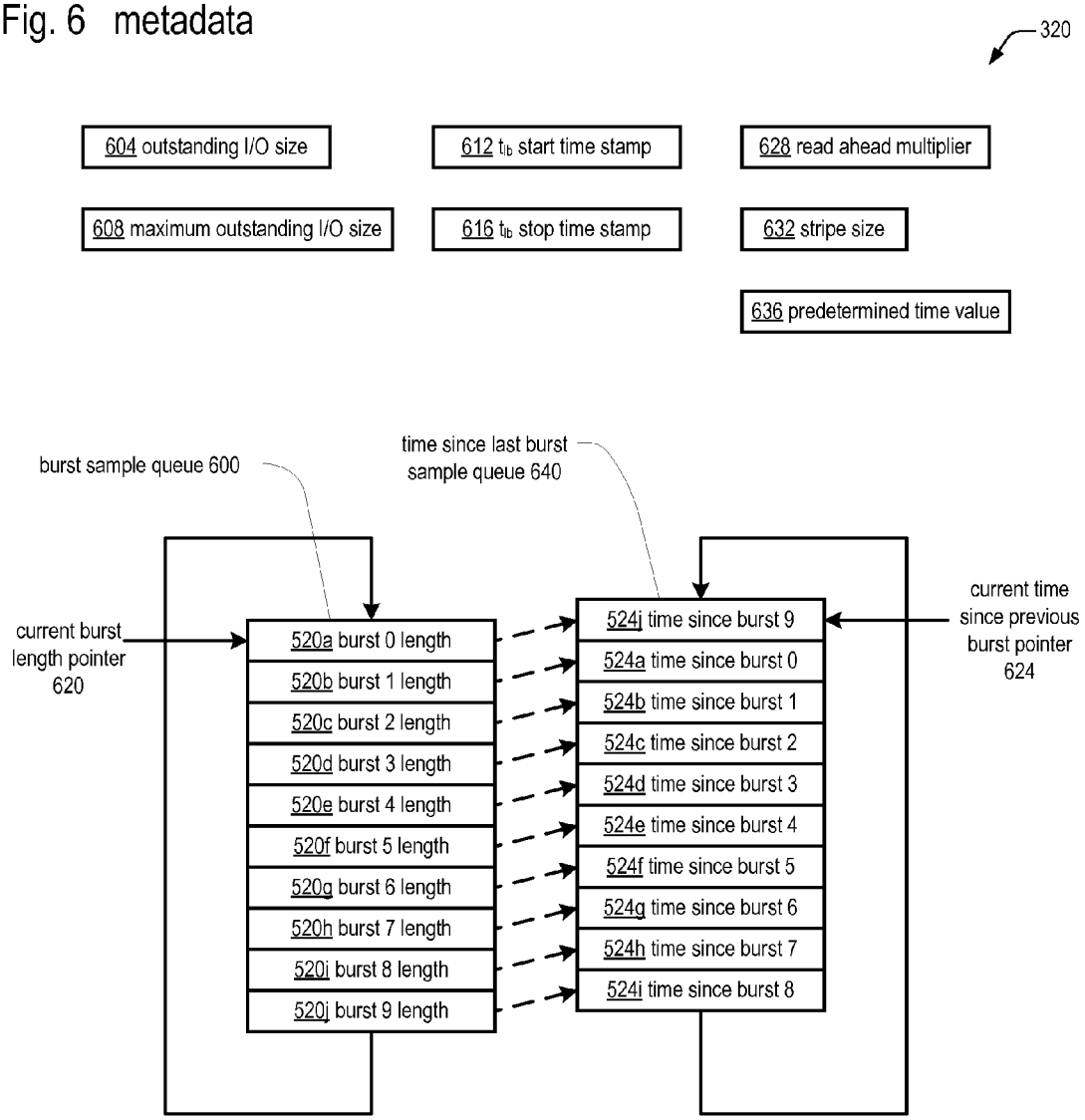

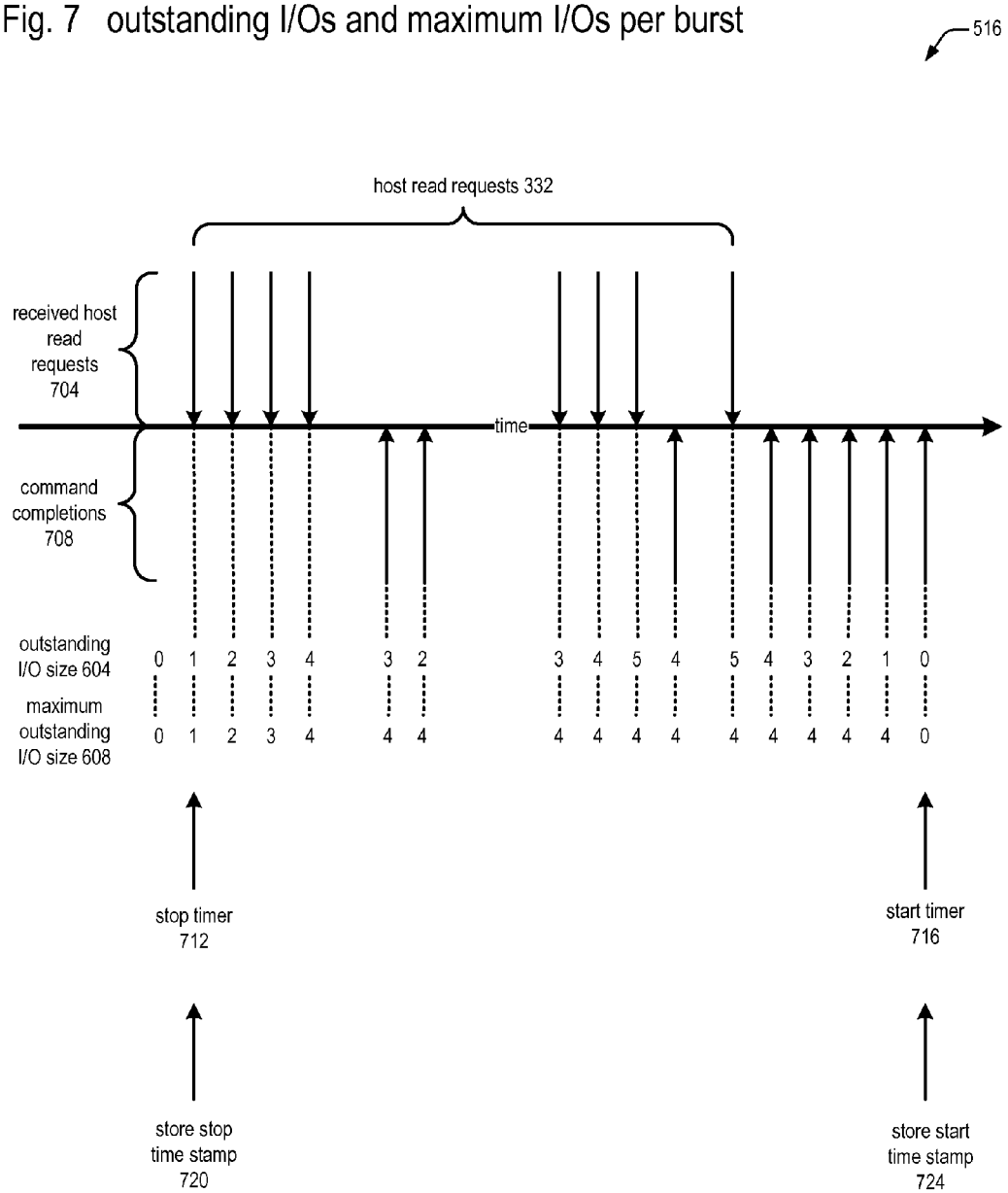
Fig. 7 outstanding I/Os and maximum I/Os per burst

Fig. 8 read request update process
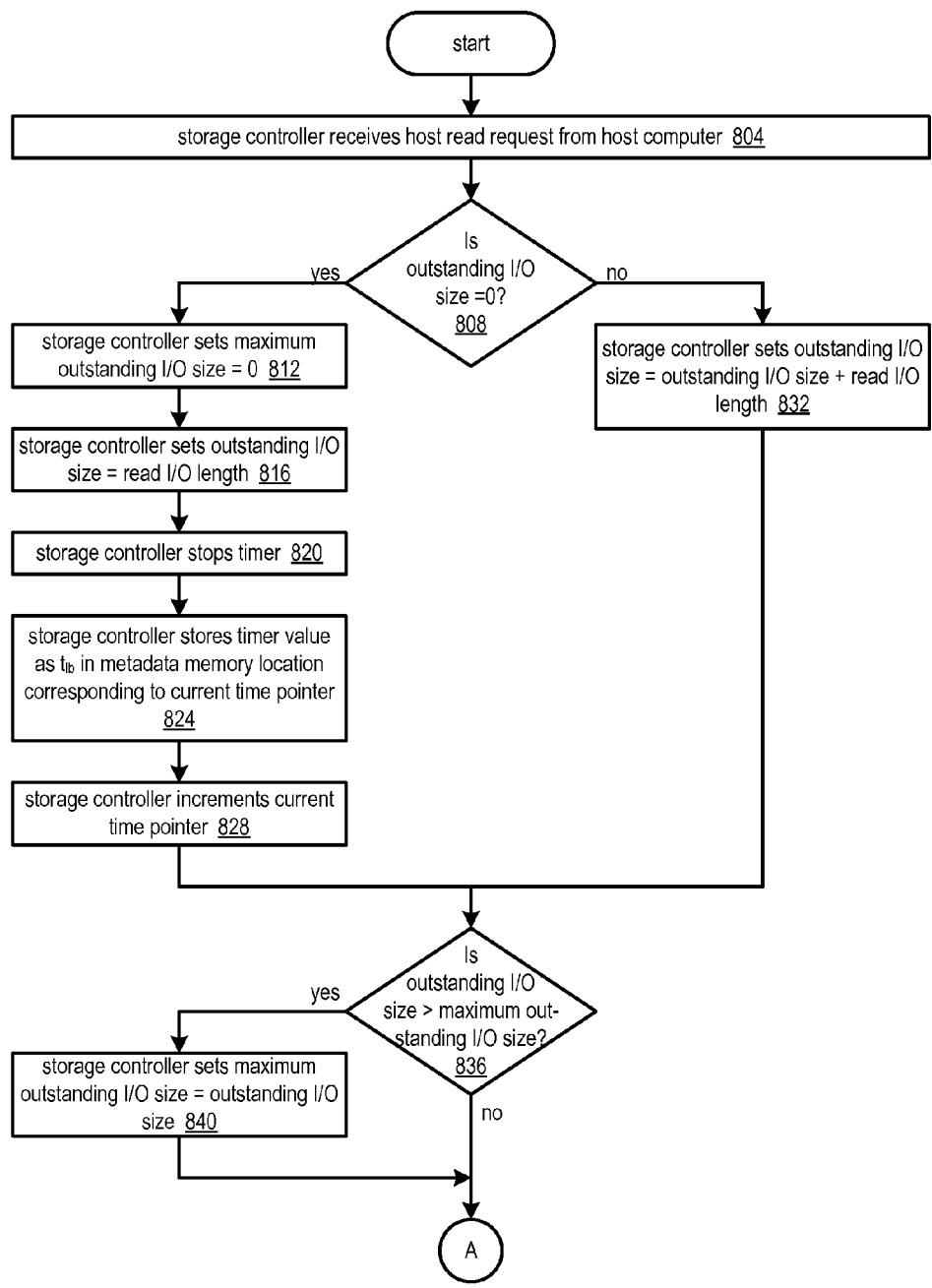

Fig. 9 command completion process
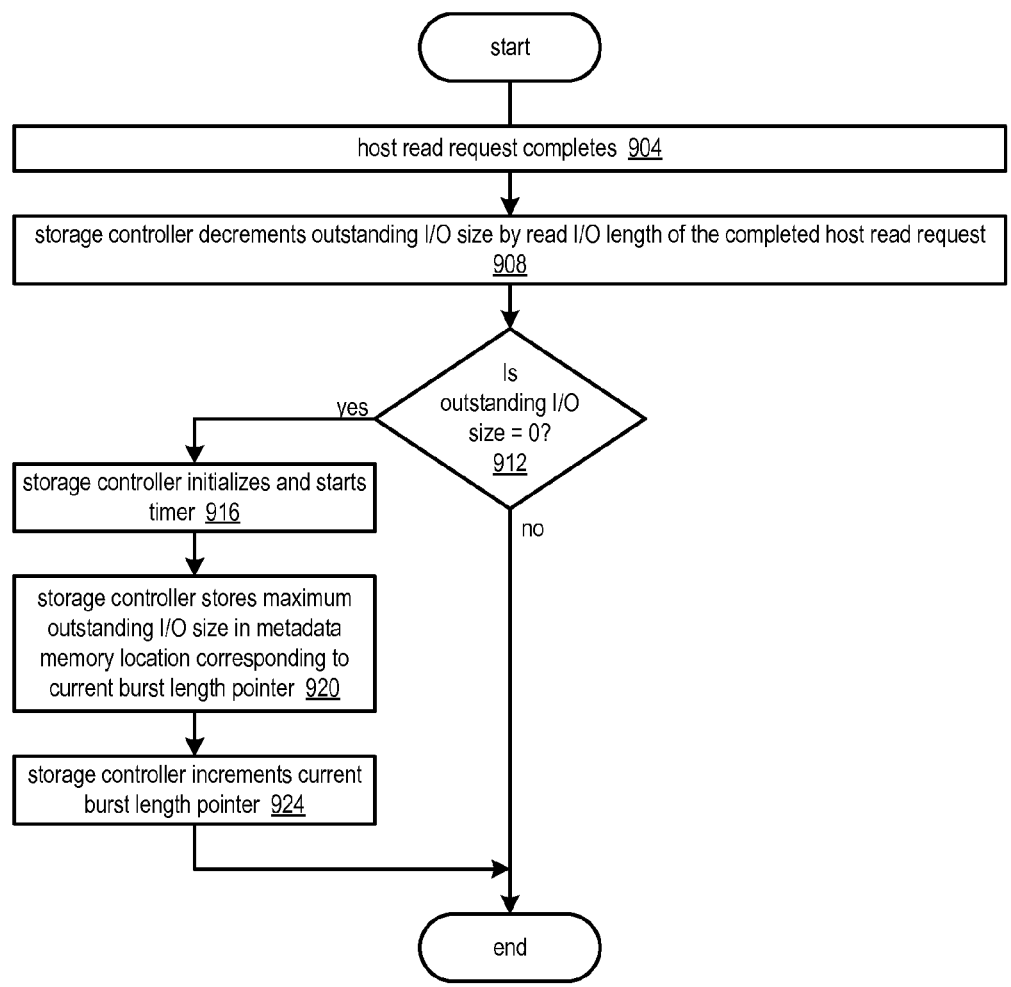

Fig. 10 read request update process
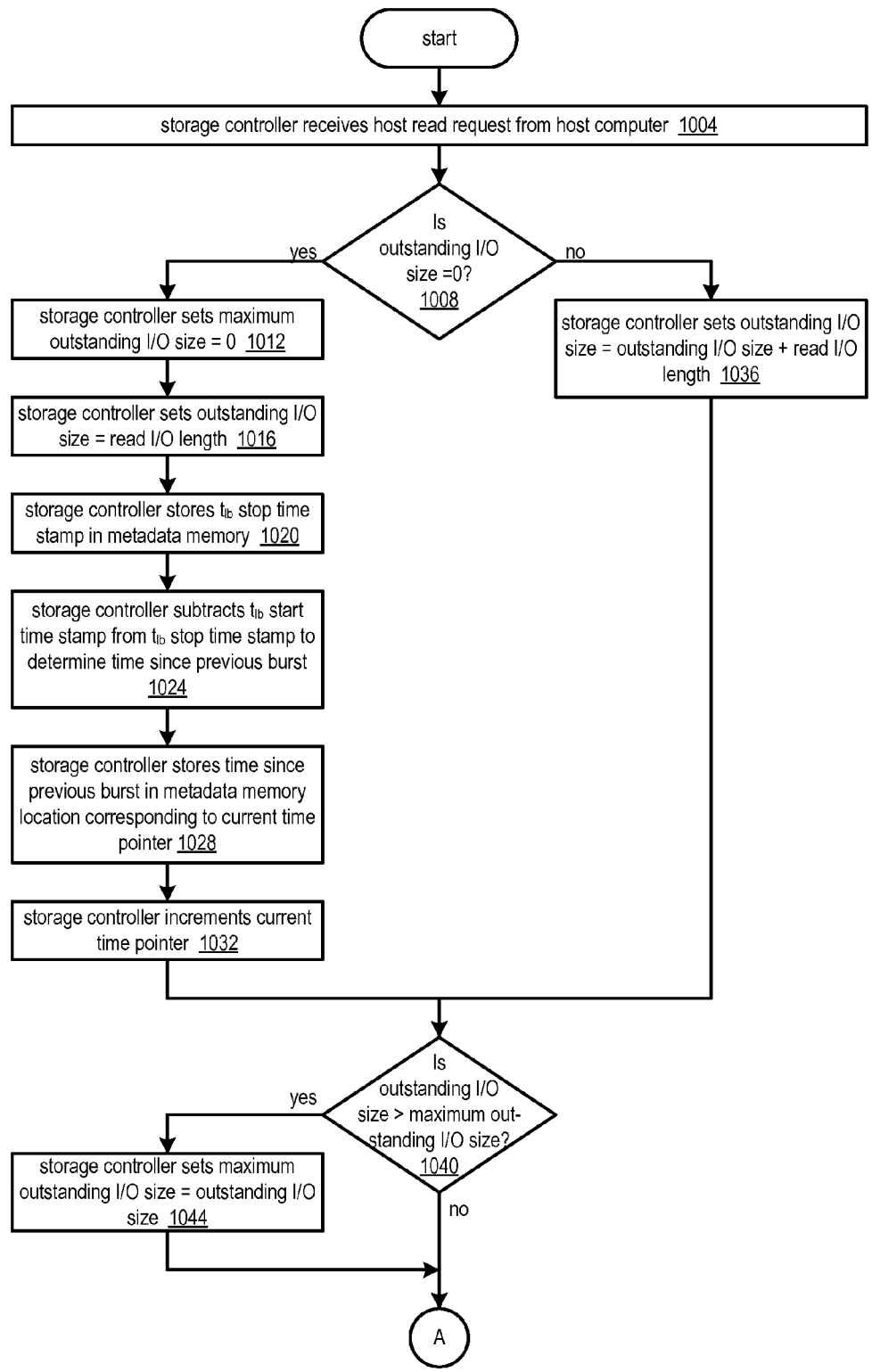

Fig. 11 command completion process
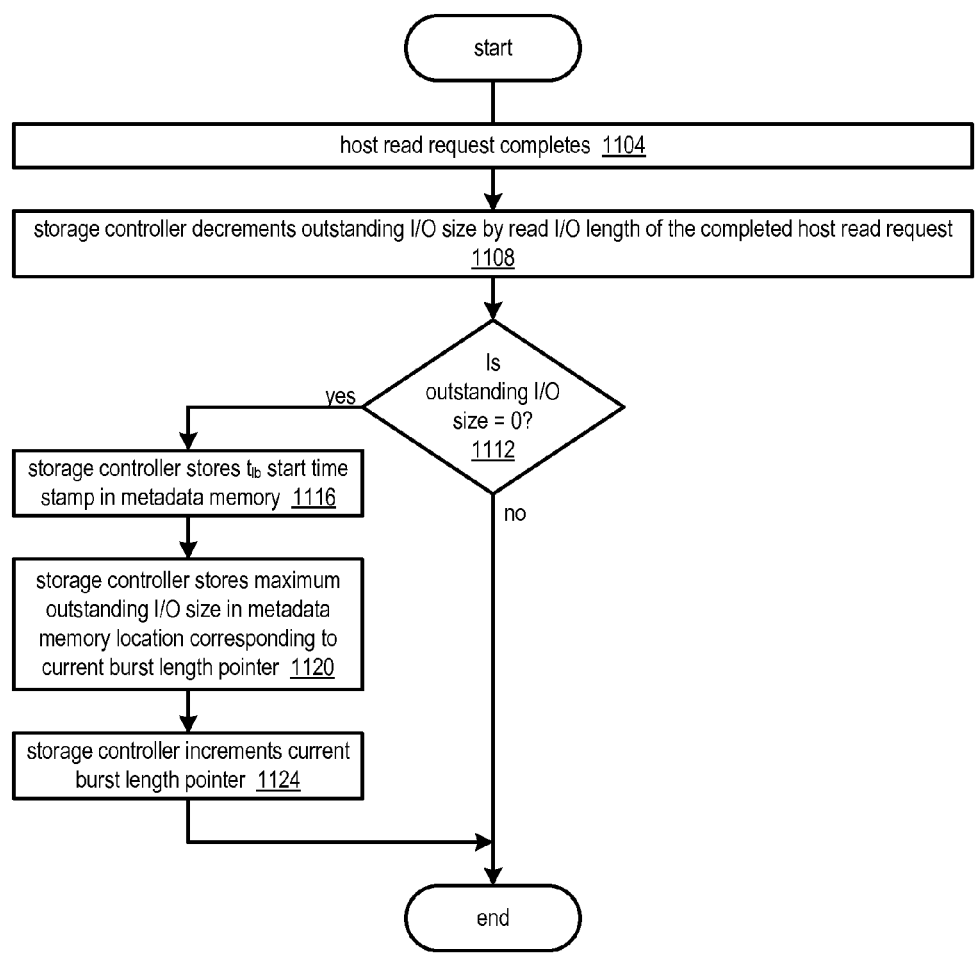

Fig. 12 read ahead process
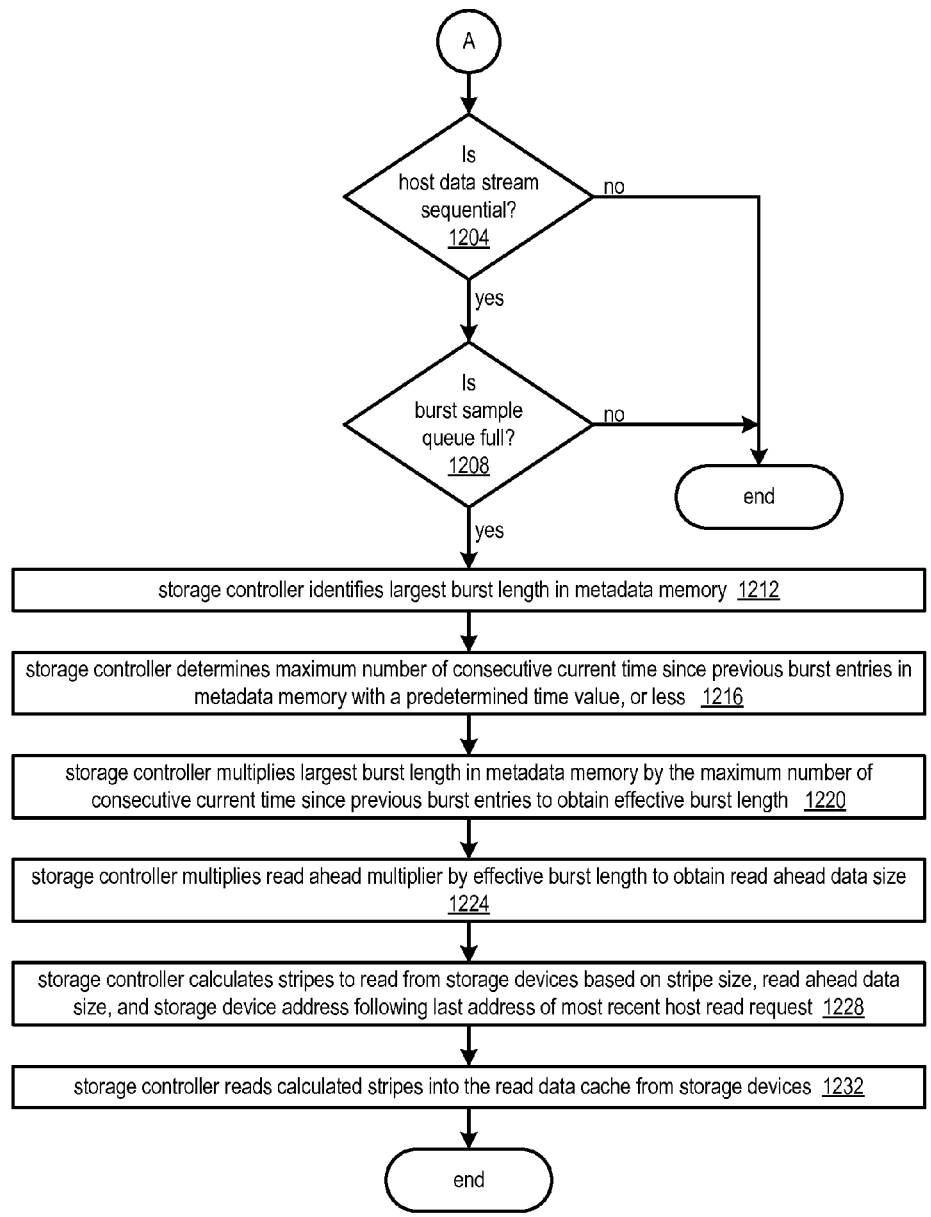

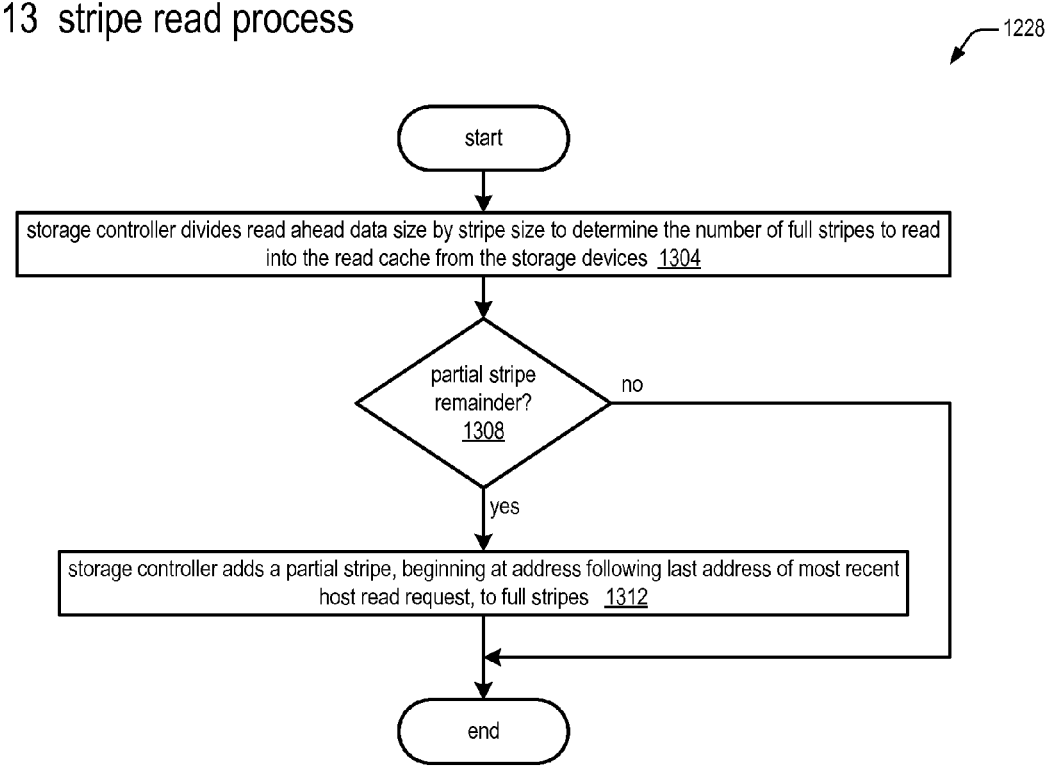
Fig. 13 stripe read process

METHOD AND APPARATUS FOR EFFICIENT CACHE READ AHEAD

CROSS REFERENCE TO RELATED APPLICATION(S)

This application claims the benefit of U.S. Provisional Application Ser. No. 61/772,266 filed Mar. 4, 2013, entitled HEURISTIC READAHEAD, which is hereby incorporated by reference for all purposes.

FIELD

The present invention is directed to computer data storage. In particular, the present invention is directed to methods and apparatuses for efficient cache read ahead from data storage devices.

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

Storage controllers generally buffer read and write data requests, often converting the host data read and write requests into RAID or storage device read or write requests. Many storage controllers store read and write data in cache memories included as part of the storage controllers. Cache memories are small compared to external storage devices such as hard drives, and generally orders of magnitude faster. However, cache memory costs significantly more per byte than storage devices, and therefore cache memory size is correspondingly small in order to be cost effective. The need is always present for cache memories to operate as efficiently as possible in order for overall storage controller performance to be maximized to all interconnected host computers.

Many storage controllers have separate areas of memory dedicated to read cache and write cache. If requested data is in the read cache when a host computer requests the data that is a "cache hit". If requested data is not in the read cache when a host computer requests the data that is a "cache miss". In the case of a read cache, it is advantageous for a cache memory to store data before a host computer requests the data. In this way, the requested data can be provided at faster cache memory speeds instead of slower storage device speeds. In order for a read cache to contain data before a host computer requests the data, it is necessary for the storage controller to predict in advance which data is likely to be requested, and perform a read ahead operation to read the data from storage devices and store the data in the read cache. Read ahead operations are desirable since they improve the ratio of cache hits to cache misses.

SUMMARY

The present invention is directed to solving disadvantages of the prior art. In accordance with embodiments of the present invention, a method for providing improved sequential read performance in a storage controller is provided. In response to the storage controller receiving a host read request from a host computer, the method includes identifying, by the storage controller, a largest burst length of a plurality of burst lengths in a memory of the storage controller, and determining a maximum number of consecutive times between bursts having a value less than a predetermined value. A burst includes a consecutive group of sequential host read requests from the same host computer. The method also includes multiplying the largest burst length of the plurality of burst lengths by the maximum number of consecutive times between bursts having a value less than the predetermined value to obtain an effective burst length and reading into a storage controller cache memory at least the effective burst length of data from storage devices coupled to the storage controller.

In accordance with another embodiment of the present invention, a storage controller for providing improved sequential read performance to a host computer is provided. The storage controller includes a processor and a memory, coupled to the processor. The memory includes a read cache. In response to the storage controller receiving a burst of host read requests from the host computer, the processor identifies a largest burst length of a plurality of burst lengths in the memory, determines a maximum number of consecutive times between bursts having a value less than a predetermined value, multiplies the largest burst length of the plurality of burst lengths by the maximum number of consecutive times between bursts having a value less than the predetermined value to obtain an effective burst length, and reads into the read cache at least the effective burst length of data from storage devices coupled to the storage controller. A burst includes a consecutive group of sequential host read requests from the same host computer.

In accordance with yet another embodiment of the present invention, a method for efficiently providing read ahead data to a read cache of a storage controller is provided. The method includes storing metadata, by the processor, into a memory of the storage controller coupled to the processor. The metadata includes a predetermined number of sequential read request burst lengths and time between consecutive groups of sequential host read requests. The method also includes determining that a consecutive group of host read requests from a host computer coupled to the storage controller is sequential, identifying, by the processor from the metadata, a largest sequential read request burst length and a maximum number of consecutive times between consecutive groups of sequential read requests having less than a predetermined time value, calculating an effective burst length from the largest sequential read request burst length and the maximum number of consecutive times between consecutive groups of sequential read requests having less than the predetermined time value, and reading at least the effective burst length of data from storage devices coupled to the storage controller into the read cache.

An advantage of the present invention is it provides a method to improve storage controller cache read ahead performance. Improved cache read ahead performance results in a higher cache read hit rate, which improves host computer read performance.

Another advantage of the present invention is it improves read cache performance without increasing the size of the read cache or adding specialized processors or memory devices. This keeps storage controller costs down and improves competitive performance compared with conventional storage controllers.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4 is a block diagram illustrating a host data stream in accordance with embodiments of the present invention.

FIG. 5a is a diagram illustrating a data stream example in accordance with embodiments of the present invention.

FIG. 5b is a diagram illustrating burst parameters in accordance with embodiments of the present invention.

FIG. 6 is a block diagram illustrating metadata stored in the metadata memory in accordance with the preferred embodiment of the present invention.

FIG. 7 is a diagram illustrating outstanding I/Os and maximum I/Os per burst in accordance with embodiments of the present invention.

FIG. 8 is a flowchart illustrating a first embodiment of a read request update process in accordance with the present invention.

FIG. 9 is a flowchart illustrating a first embodiment of a command completion process in accordance with the present invention.

FIG. 10 is a flowchart illustrating a second embodiment of a read request update process in accordance with the present invention.

FIG. 11 is a flowchart illustrating a second embodiment of a command completion process in accordance with the present invention.

FIG. 12 is a flowchart illustrating a read ahead process in accordance with embodiments of the present invention.

FIG. 13 is a flowchart illustrating a stripe read process in accordance with embodiments of the present invention.

DETAILED DESCRIPTION

The present invention is directed to improvements to read cache hits in a storage controller from host computer read requests. Keeping in mind the desire to maintain a small read cache memory to keep the storage controller cost down, it is necessary to improve read cache efficiency and performance.

One way to improve read cache performance is simply to increase the amount of read ahead data as much as possible for each received read request. However, this will usually fill the read cache with useless data that the host computer may never request or may request much later. Additionally, in systems where a storage controller is coupled to multiple host computers, filling a cache with large amounts of read ahead data for a specific host computer may prevent other host computers from utilizing the read cache, severely limiting read performance to the other host computers.

Each host computer issues read data requests based on the applications and other programs executed by that host computer. In most cases, the applications and other programs currently being executed by one host computer is different than the applications and other programs being executed by a different host computer. Each host computer therefore issues a different set of read requests, which are known as a host stream. In general, storage controllers attempt to maintain a static amount of read ahead data in the read cache for each host stream. A given host computer can issue multiple host streams.

While a static read cache size is generally efficient for host computers that provide a relatively constant stream of read requests, this is often not the case for host computers that issue bursts of read requests to storage controllers. A burst is a consecutive group of sequential host read requests from the same host computer. A burst of host read requests creates a high initial queue depth. If the burst of host read requests adds up to more than the static read ahead size of the read cache, the host stream will eventually catch up with read ahead and cache misses will occur with every burst.

What is needed is a storage controller that maintains only enough read ahead data in read cache for each host stream so that cache hits are maximized while reducing unneeded space allocated to unused read ahead data.

Figure 1A:
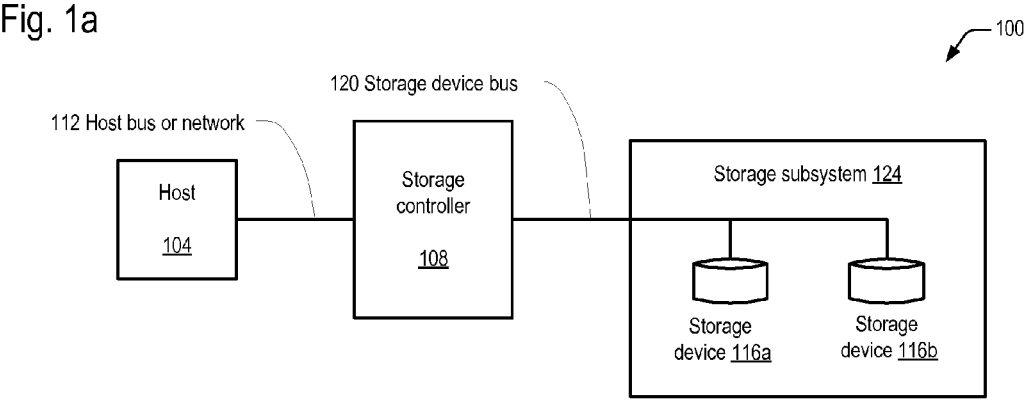
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
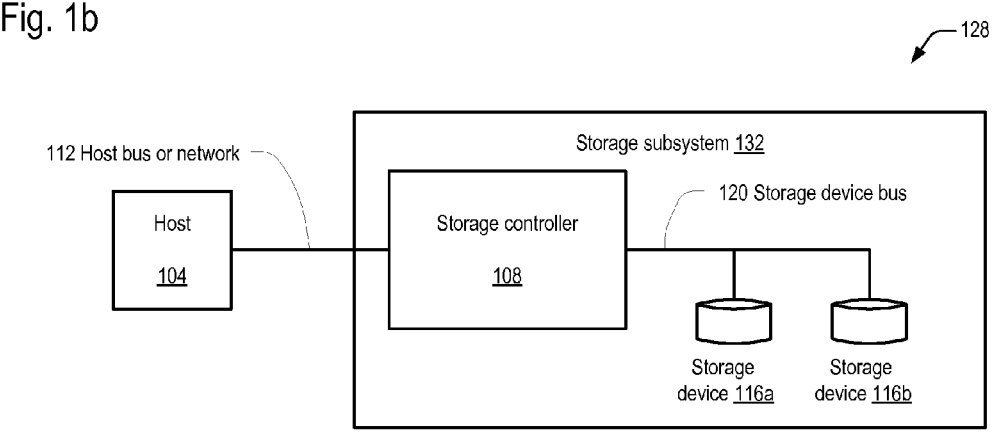
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
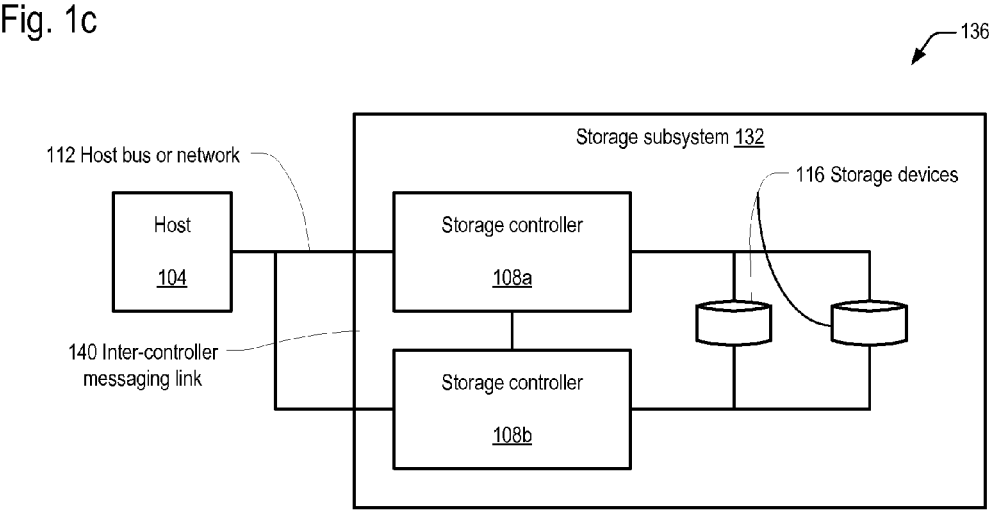
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
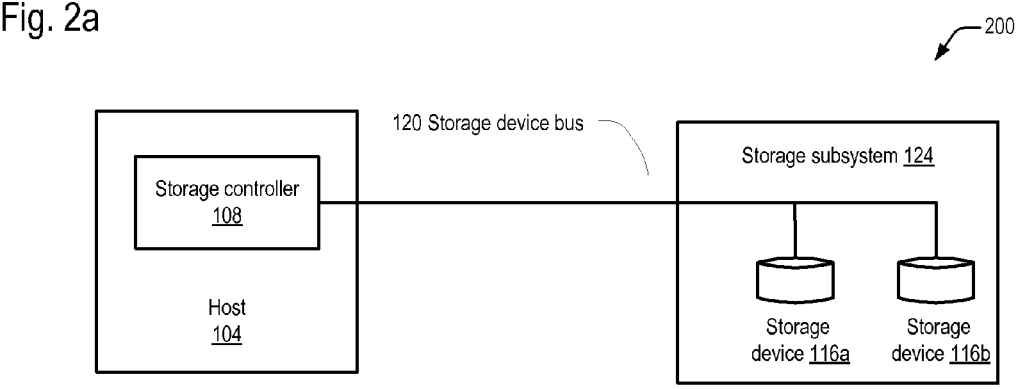
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
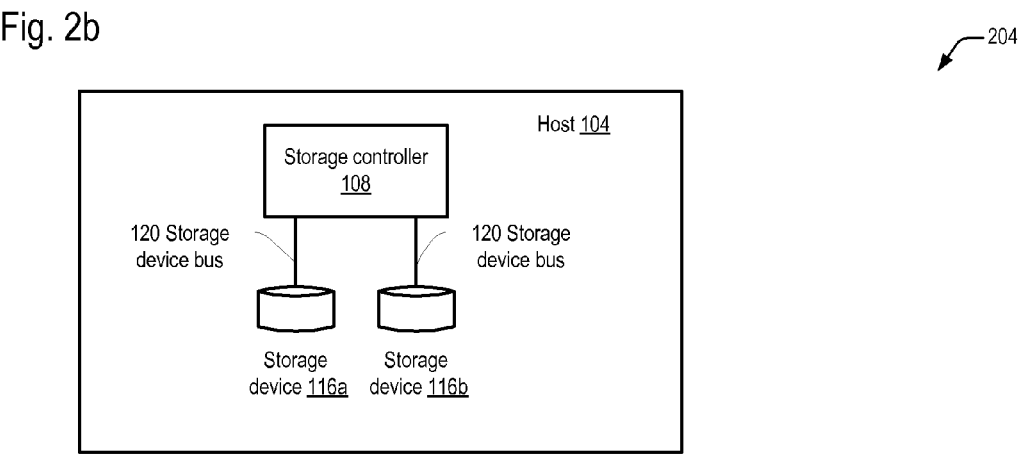
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
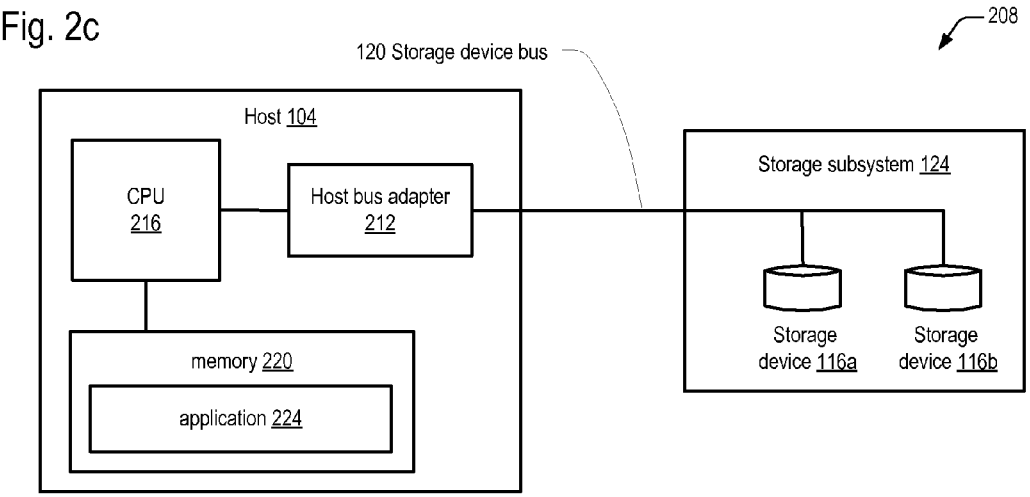
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 104 interconnected to a storage controller 108 through bus or network 112. Host computer 104 generates a host stream 308, which are multiple groups of host read requests 332.

Storage controller 108 includes a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present invention. Examples of non-volatile memory 316 include, but are not limited to, flash memory, SD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read data cache 324 and in some embodiments a write data cache 328, which provide improved read and write performance, respectively, to the host computer 104. Memory 316 also includes data stream metadata 320. Data stream metadata 320 stores parameters related to host read requests 332, and are used to control read ahead operations to the read data cache 324.

Storage controller 108 is coupled to storage subsystem 124, 132, which includes one or more storage devices 116a-116n. Frequently accessed data is read from storage devices 116 into the read data cache 324, where it can be provided in response to host read requests 332 much faster than directly from the storage devices 116.

In some embodiments, storage controller 108 includes a timer 340. Timer 340 may be a hardware timer controlled by CPU 312, or it may be a software routine that executes on CPU 312. Timer 340 measures the time between bursts, and is discussed in the following description and figures.

It should be understood that storage controller 108 may be functionally organized in countless different functional organizations and architectures without diverting from the scope or operation of the present invention.

Referring now to FIG. 4, a block diagram illustrating a host data stream 308 in accordance with embodiments of the present invention is shown. Host data stream 308 includes groups of consecutive host read requests 332, which are known as bursts or host bursts. Although host data stream 308 may include any number of bursts or host bursts, four host bursts are shown: host burst 0 404, host burst 1 412, host burst 2 420, and host burst 3 428. Each host burst 404, 412, 420, 428 may include the same or a different number of host read requests 332. Host burst 0 404 includes host read request 0 408a through host read request q 408q. Host burst 1 412 includes host read request 0 416a through host read request t 416t. Host burst 2 420 includes host read request 0 424a through host read request w 424w. Host burst 3 428 includes host read request 0 432a through host read request z 432z.

Each host read request 332, 408, 416, 424, and 432 includes a read I/O length 440 and a read I/O address 444. Read I/O length 440 is the number of blocks or bytes to be read from storage devices 116, and the read I/O address 444 is the starting address the host read request 332, 408, 416, 424, and 432 will be read from.

Referring now to FIG. 5a, a diagram illustrating a data stream example in accordance with embodiments of the present invention is shown. A group of 6 bursts 516 are shown received over time 512 by a storage controller 108, with burst size 508 in Megabytes (MB) shown for each burst 516. The example illustrated in FIG. 5a depicts 6 bursts of sequential host read requests 332, identified as burst 0 516a, burst 1 516b, burst 2 516c, burst 3 516d, burst 4 516e, and burst 5 516f.

The time between bursts $t_{lb}$ is shown between every two consecutive bursts 516. The time between burst 0 516a and burst 1 516b is $t_{lb0}$. The time between burst 1 516b and burst 2 516c is $t_{lb1}$. The time between burst 2 516c and burst 3 516d is $t_{lb2}$. The time between burst 3 516c and burst 4 516d is $t_{lb3}$. The time between burst 4 516d and burst 5 516e is $t_{lb4}$.

Referring now to FIG. 5b, a diagram illustrating burst parameters in accordance with embodiments of the present invention is shown. FIG. 5b references the example of FIG. 5a to illustrate burst parameters stored in metadata memory 320.

Each burst 516 has an associated burst length 520 parameter, with burst 0 516a having a burst length 520 of 2 MB, burst 1 516b having a burst length 520 of 1 MB, burst 2 516c having a burst length 520 of 6 MB, burst 3 516d having a burst length 520 of 2 MB, burst 4 516e having a burst length 520 of 1 MB, and burst 5 516f having a burst length 520 of 2 MB. Between each burst 516 is a time since last burst $t_{lb}$ 524. $T_{lb0}$ is 200 ms, $T_{lb1}$ is 30 ms, $T_{lb2}$ is 60 ms, $T_{lb3}$ is 120 ms, and $T_{lb4}$ is 200 ms.

Referring now to FIG. 6, a block diagram illustrating metadata stored in the metadata memory 320 in accordance with the preferred embodiment of the present invention is shown. The metadata memory 320 stores parameters used in the process of the present invention.

The metadata memory 320 includes an outstanding I/O size 604 parameter. The outstanding I/O size 604 is the cumulative size of all host read requests 332 in the same burst that the storage controller 108 is waiting for the storage devices 116 to complete. Host read requests 332 are considered outstanding between the time the storage controller 108 receives the host read requests 332 and the storage devices 116 fulfills those requests and sends the requested data back to the host computer 104. Once a host read request 332 is completed, the size of the completed host read request 332 is deducted from the outstanding I/O size 604.

The metadata memory 320 includes a maximum outstanding I/O size 608 parameter. The maximum outstanding I/O size 608, or largest burst length of a plurality of burst lengths, is the maximum value the outstanding I/O size 604 reaches in the current burst 516. When the storage controller 108 detects a new burst 516, the storage controller 108 initializes the maximum outstanding I/O size 608 to zero. Each time the outstanding I/O size 604 exceeds the maximum outstanding I/O size 608, the storage controller 108 sets the maximum outstanding I/O size 608 to the outstanding I/O size 604.

The storage controller 108 measures the time since last burst $t_{lb}$ one of two ways. In one embodiment, the storage controller includes a timer 340. The storage controller 108 starts the timer 340 when a burst 516 ends, and stops the timer 340 when the next burst 516 starts. The timer 340 value is stored as the time since last burst $t_{lb}$ 524 at the location in metadata memory 320 identified by a current time since previous burst pointer 624. In another embodiment, the metadata memory 320 includes a $t_{lb}$ start time stamp 612 and a $t_{lb}$ stop time stamp 616. The $t_{lb}$ start time stamp 612 is a free-running timer 340 value that is stored when a burst 516 ends. The $t_{lb}$ stop time stamp 616 is a free-running timer 340 value that is stored when the next burst 516 starts. The difference between the $t_{lb}$ start time stamp 612 and the $t_{lb}$ stop time stamp 616 is stored as the time since last burst $t_{lb}$ 524 at the location in metadata memory 320 identified by the current time since previous burst pointer 624.

The metadata memory 320 also includes a read ahead multiplier 628. Once an effective burst length has been determined (block 1220 of FIG. 12), the effective burst length is multiplied by the read ahead multiplier 628 in order to determine the read ahead data size (block 1224 of FIG. 12). In the preferred embodiment, the read ahead multiplier 628 is 3. In other embodiments, the read ahead multiplier 628 may be less than or more than 3. Also, the read ahead multiplier 628 may be an integer or an integer plus a fractional component. In general, the initial read ahead multiplier 628 for a new system is set to 2. If it is found that the host stream 308 frequently catches up with the read ahead operations, the read ahead multiplier 628 is incremented to 3, and retested. The test process is repeated until the host stream 308 no longer catches up to the read ahead operations, or only rarely does.

The metadata memory 320 also includes a stripe size 632. The stripe size 632 is a data storage parameter that designates how data is arranged on storage devices 116. When a stripe size 632 is provided, the storage controller 108 stores data on storage devices 116 in equal-size stripes. This improves read and write performance by allowing multiple storage devices 116 to be accessed at the same time, and distributes read and write latencies across all of the storage devices 116. Although the present invention does not require storage devices 116 to be striped, in the preferred embodiment, storage devices 116 are striped in order to maximize read ahead performance.

The metadata memory 320 includes a predetermined time value 636. The predetermined time value 636 specifies a maximum time since last burst $t_{lb}$ value that the storage controller 108 will look for in time since last burst $t_{lb}$ 524 entries (block 1216 of FIG. 12) in order to calculate the read ahead data size. In the preferred embodiment, the predetermined time value 636 is 100 milliseconds (ms). In other embodiments, the predetermined time value 636 is less than or more than 100 ms. The predetermined time value 626 is based on average response time for the attached media. If bursts 516 come in with a delay value smaller than the predetermined time value 626, the bursts 516 should be treated as separate because the media would perform better to have those bursts 516 combined into a single burst 516.

Key to the present invention are two data structures in metadata memory 320 that store burst lengths 520 and times since last burst $t_{lb}$ 524. A burst sample queue 600 stores a predetermined number of burst lengths 520, and a time since last burst sample queue 640 stores a predetermined number of time since last burst $t_{lb}$ 524 values.

In the preferred embodiment, both data structures 600 and 640 are circular queues where the newest burst length 520 or time since last burst $t_{lb}$ 524 overwrites the oldest burst length 520 or time since last burst $t_{lb}$ 524, respectively. The number of burst length 520 entries is equal to the number of time since last burst $t_{lb}$ 524 entries, and there are a predetermined number of entries 520, 524. In the preferred embodiment, there are 10 entries for each queue 600 and 640. The current burst length 520 entry is identified by a current burst length pointer 620, which increments to point to a next burst length 520 entry after a new burst length 520 is stored. The current time since last burst $t_{lb}$ 524 entry is identified by a current time since previous burst pointer 624, which increments to point to a next time since last burst $t_{lb}$ 524 entry after a new time since last burst $t_{lb}$ 524 entry is stored.

Although circular queues are illustrated for both the burst sample queue 600 and time since last burst sample queue 640, it should be understood by one of ordinary skill in the art that any number of data structures can be utilized for storing a plurality of burst lengths 520 and times since last burst $t_{lb}$ 524 values, including multiple data structures for each.

Referring now to FIG. 7, a diagram illustrating outstanding I/Os and maximum I/Os per burst 516 in accordance with embodiments of the present invention is shown. FIG. 7 illustrates the practical interaction of various parameters over time of the present invention for a burst 516 of host read requests 332. For simplification purposes, it is assumed that the I/O size for all host read requests 332 is '1' (a block, for example).

Prior to a first host read request 332 for the burst 516, both the outstanding I/O size 604 and the maximum outstanding I/O size 608 are zero. When the storage controller 108 receives a first host read request 332 for the burst 516, the outstanding I/O size 604 becomes '1'—reflecting the size of the first host read request 332, and either the timer 340 is stopped 712, or else a stop time stamp is stored 720. Also, the maximum outstanding I/O size 608 is set to '1' since the outstanding I/O size 604 (1) is greater than the maximum outstanding I/O size 608 (0).

The outstanding I/O size 604 and maximum outstanding I/O size 608 parameters are logged as more host read requests 332 are received by the storage controller 108. However, when command completions 708 occur, the storage controller 108 decreases the outstanding I/O size 604 by the size of each completed host read request 332. The storage controller 108 further maintains the maximum outstanding I/O size 608 even if command completions 708 occur within the current burst 516, as long as the outstanding I/O size 604 is not zero. In that case, the storage controller 108 initializes the maximum outstanding I/O size 608 back to zero in order to await the next burst 516. Once the outstanding I/O size 604 returns to zero (indicating the end of the current burst 516), the storage controller 108 either starts the timer 716 or else stores the start time stamp 724 in metadata memory 320. This sequence of operations is then repeated for each subsequent burst 516.

Referring now to FIG. 8, a flowchart illustrating a first embodiment of a read request update process in accordance with the present invention is shown. The embodiment illustrated in FIG. 8 uses a timer 340 to measure the time between bursts 516. Flow begins at block 804.

At block 804, the storage controller 108 receives a host read request 332 from a host computer 104. Flow proceeds to decision block 808.

At decision block 808, the storage controller 108 determines if the outstanding I/O size 604 is equal to zero. If the outstanding I/O size 604 is equal to zero, then flow proceeds to block 812. If the outstanding I/O size 604 is not equal to zero, then flow proceeds to block 832.

At block 812, the storage controller 108 sets the maximum outstanding I/O size 608 equal to zero. A new burst has started, and the maximum outstanding I/O size 608 is initialized to zero. Flow proceeds to block 816.

At block 816, the storage controller 108 sets the outstanding I/O size 604 equal to the read I/O length 440 of the received host read request 332. This operation initializes the outstanding I/O size 604 for the first host read request 332 in a burst 516. Flow proceeds to block 820.

At block 820, the storage controller 108 stops the timer 340. The timer 340 stops counting when it is stopped. Flow proceeds to block 824.

At block 824, the storage controller 108 stores the timer 340 value as the time since the last burst $t_{lb}$ 524 in the metadata memory location 320 corresponding to the current time pointer 624. Flow proceeds to block 828.

At block 828, the storage controller 108 increments the current time pointer 624. This prepares the next time since the last burst $t_{lb}$ 524 location to store the next timer 340 value. Flow proceeds to decision block 836.

At block 832, the storage controller 108 sets the outstanding I/O size 604 to the sum of the outstanding I/O size 604 and the read I/O length 440. This operation maintains the outstanding I/O size 604 for host read requests 332 other than the first host read request 332 for a burst. Flow proceeds to decision block 836.

At decision block 836, the storage controller 108 determines if the outstanding I/O size 604 is greater than the maximum outstanding I/O size 608. This operation is a check to determine if the maximum outstanding I/O size 608 represents the highest value for outstanding I/O size 604 in the current burst 516. If the outstanding I/O size 604 is greater than the maximum outstanding I/O size 608, then flow proceeds to block 840. If the outstanding I/O size 604 is not greater than the maximum outstanding I/O size 608, then flow proceeds to the read ahead process of FIG. 12 at decision block 1204.

At block 840, the storage controller 108 sets the maximum outstanding I/O size 608 to the outstanding I/O size 604. Flow proceeds to the read ahead process of FIG. 12 at decision block 1204.

Referring now to FIG. 9, a flowchart illustrating a first embodiment of a command completion process in accordance with the present invention is shown. Flow begins at block 904.

At block 904, a host read request 332 completes. Therefore, there is one less outstanding I/O request than previously. Flow proceeds to block 908.

At block 908, the storage controller 108 decrements the outstanding I/O size 604 by the read I/O length 440 of the completed host read request 332. Flow proceeds to decision block 912.

At decision block 912, the storage controller 108 determines if the outstanding I/O size 604 is equal to zero. If the outstanding I/O size 604 is equal to zero, then the current burst 516 has ended and flow proceeds to block 916. If the outstanding I/O size 604 is not equal to zero, then there remains additional host read requests 332 to complete in the current burst 516 and flow ends.

At block 916, the storage controller 108 initializes and starts the timer 340. Initializing the timer 340 means the timer 340 starts counting from a known value, usually zero. Flow proceeds to block 920.

At block 920, the storage controller 108 stores the maximum outstanding I/O size 608 in the metadata memory location 520 corresponding to the current burst length pointer 620. The storage controller 108 records the highest value of the outstanding I/O size 604 for the current burst 516, which is the maximum outstanding I/O size 608. Flow proceeds to block 924.

At block 924, the storage controller 108 increments the current burst length pointer 620. This prepares the next burst length 520 location to store the maximum outstanding I/O size 608 for the next burst 516. Flow ends at block 924.

Referring now to FIG. 10, a flowchart illustrating a second embodiment of a read request update process in accordance with the present invention is shown. The embodiment illustrated in FIG. 10 uses time stamps 612 and 616 to measure the time between bursts 516. Flow begins at block 1004.

At block 1004, the storage controller 108 receives a host read request 332 from a host computer 104. Flow proceeds to decision block 1008.

At decision block 1008, the storage controller 108 determines if the outstanding I/O size 604 is equal to zero. If the outstanding I/O size 604 is equal to zero, then flow proceeds to block 1012. If the outstanding I/O size 604 is not equal to zero, then flow proceeds to block 1036.

At block 1012, the storage controller 108 sets the maximum outstanding I/O size 608 equal to zero. A new burst 516 has started, and the maximum outstanding I/O size 608 is initialized to zero. Flow proceeds to block 1016.

At block 1016, the storage controller 108 sets the outstanding I/O size 604 equal to the read I/O length 440 of the received host read request 332. This operation initializes the outstanding I/O size 604 for the first host read request 332 in a burst 516. Flow proceeds to block 1020.

At block 1020, the storage controller 108 stores a stop time stamp 616 in the metadata memory 320. The stop time stamp 616 will be used in conjunction with the start time stamp 612 to calculate the time since burst $t_{lb}$ 524 in block 1024. Flow proceeds to block 1024.

At block 1024, the storage controller 108 calculates the time since the last burst $t_{lb}$ 524 by subtracting the start time stamp 612 from the stop time stamp 616. Flow proceeds to block 1028.

At block 1028, the storage controller 108 stores the time since the last burst $t_{lb}$ 524 in the metadata memory location 320 corresponding to the current time since previous burst pointer 624. Flow proceeds to block 1032.

At block 1032, the storage controller 108 increments the current time since last burst pointer 624. This prepares the next time since the last burst $t_{lb}$ 524 location to store the next time since the last burst $t_{lb}$ 524 value. Flow proceeds to decision block 1040.

At block 1036, the storage controller 108 sets the outstanding I/O size 604 to the sum of the outstanding I/O size 604 and the read I/O length 440. This operation maintains the outstanding I/O size 604 for host read requests 332 other than the first host read request 332 for a burst. Flow proceeds to decision block 1040.

At decision block 1040, the storage controller 108 determines if the outstanding I/O size 604 is greater than the maximum outstanding I/O size 608. This operation is a check to determine if the maximum outstanding I/O size 608 represents the highest value for outstanding I/O size 604 in the current burst 516. If the outstanding I/O size 604 is greater than the maximum outstanding I/O size 608, then flow proceeds to block 1044. If the outstanding I/O size 604 is not greater than the maximum outstanding I/O size 608, then flow proceeds to the read ahead process of FIG. 12 at decision block 1204.

At block 1044, the storage controller 108 sets the maximum outstanding I/O size 608 to the outstanding I/O size 604. Flow proceeds to the read ahead process of FIG. 12 at decision block 1204.

Referring now to FIG. 11, a flowchart illustrating a second embodiment of a command completion process in accordance with the present invention is shown. The embodiment illustrated in FIG. 11 uses a timer 340 to measure the time between bursts 516. Flow begins at block 1104.

At block 1104, a host read request 332 completes. Therefore, there is one less outstanding I/O request than previously. Flow proceeds to block 1108.

At block 1108, the storage controller 108 decrements the outstanding I/O size 604 by the read I/O length 440 of the completed host read request 332. Flow proceeds to decision block 1112.

At decision block 1112, the storage controller 108 determines if the outstanding I/O size 604 is equal to zero. If the outstanding I/O size 604 is equal to zero, then the current burst 516 has ended and flow proceeds to block 1116. If the outstanding I/O size 604 is not equal to zero, then there remains additional host read requests 332 to complete in the current burst 516 and flow ends.

At block 1116, the storage controller 108 stores a start time stamp 612 in the metadata memory 320. The start time stamp 612 will be used in conjunction with the stop time stamp 616 to calculate the time since burst $t_{lb}$ 524 in block 1024. Flow proceeds to block 1120.

At block 1120, the storage controller 108 stores the maximum outstanding I/O size 608 in the metadata memory location 520 corresponding to the current burst length pointer 620. The storage controller 108 records the highest value of the outstanding I/O size 604 for the current burst 516, which is the maximum outstanding I/O size 608. Flow proceeds to block 1124.

At block 1124, the storage controller 108 increments the current burst length pointer 620. This prepares the next burst length 520 location to store the maximum outstanding I/O size 608 for the next burst 516. Flow ends at block 1124.

Referring now to FIG. 12, a flowchart illustrating a read ahead process in accordance with embodiments of the present invention is shown. Flow begins at decision block 1204.

At decision block 1204, the storage controller 108 determines if the host data stream 308 is sequential. There are many ways of determining if a data stream is sequential, based generally on address locality to previous data requests. In some embodiments, a data stream 308 is sequential if the host read request 332 of blocks 804 and 1004 is in the same or an adjacent data block as the previous host read request 332. In other embodiments, a data stream 308 is sequential if the host read request 332 of blocks 804 and 1004 is in the same stripe as an adjacent data block as the previous host read request 332.

In yet other embodiments, a data stream 308 is sequential if the host read request 332 of blocks 804 and 1004 is to the next sequential address following the previous host read request 332. Semi-sequential data patterns are possible, as well. For example, assume sequential stripes A, B, C, and D. In some cases, a host computer 104 will read these stripes partially out of sequential order, for example: A, C, B, and then D, or A, B, and then D. Relative to the present invention, this would still be considered sequential. If the host data stream 308 is sequential, then flow proceeds to decision block 1208. If the host data stream 308 is not sequential, then flow ends.

At decision block 1208, the storage controller 108 determines if the burst sample queue 600 is full. The burst sample queue 600 stores a predetermined number of burst lengths 520. Until the burst sample queue 600 is full, the process of the present invention lacks sufficient data to make accurate read ahead decisions. If the burst sample queue 600 is not full, conventional read ahead methods known in the art are used and the process ends. If the burst process queue 600 is full, then flow proceeds to block 1212.

At block 1212, the storage controller 108 identifies the largest burst length 520 in metadata memory 320. Flow proceeds to block 1216.

At block 1216, the storage controller 108 determines the maximum number of consecutive current time since previous burst 524 entries in the metadata memory 320 with a predetermined time value 636, or less. In the preferred embodiment, the predetermined time value 636 is 100 milliseconds (ms). Therefore, for the preferred embodiment, the storage controller 108 looks for the largest consecutive group of current time since previous burst 524 entries, where all entries of the consecutive groups have values of 100 ms, or less. For example, if three such entries were the largest consecutive group, then this step would produce a result of '3'.

In an alternative embodiment, the storage controller 108 maintains an average response time for each virtual disk or logical volume controlled by the storage controller 108. This would allow a greater degree of accuracy in dynamically determining the predetermined time value 636. Virtual disks or logical volumes are commonly stored on the same type and model of storage device 116. However, different virtual disks or logical volumes may use different types or models of storage devices 116, to account for differing performance requirements or what storage devices 116 were available when the virtual disk or logical volume was originally created.

In some embodiments, average response time is determined by calculating response time over a number of samples. In one embodiment, the most recent 10 samples for each virtual disk or logical volume are stored in metadata 320. In another embodiment, less than or more than the most recent 10 samples for each virtual disk or logical volume are stored in metadata 320. In other embodiments, response times for the number of storage devices 116 accessed in each virtual disk or logical volume are maintained in the metadata 320. Flow proceeds to block 1220.

At block 1220, the storage controller 108 multiplies the largest burst length 520 in metadata memory 320 by the maximum number of consecutive current time since previous burst 520 entries in order to obtain an effective burst length. The effective burst length is the building block for efficient read ahead operations by the storage controller 108. Flow proceeds to block 1224.

At block 1224, the storage controller 108 multiplies the read ahead multiplier 628 by the effective burst length from block 1220 to determine the read ahead data size. The read ahead multiplier 628 is used in order to account for larger bursts 516 that the host computer 104 may issue in the future, as well as read performance differences depending on storage controller 108 design and storage devices 116 performance. Flow proceeds to block 1228.

At block 1228, the storage controller 108 calculates stripes to read from the storage devices 116 based on stripe size 632, read ahead data size, and the storage device address following the last address 444 of the most recent host read request 332. Although the present invention can be used with unstriped storage devices 116, in the preferred embodiment striped storage devices 116 are used in order to gain greater storage efficiency. Flow proceeds to block 1232.

At block 1232, the storage controller 108 reads the calculated stripes from block 1228 into the read data cache 324 from the storage devices 116. Flow ends at block 1232.

Referring now to FIG. 13, a flowchart illustrating a stripe read process 1228 in accordance with embodiments of the present invention is shown. Flow begins at block 1304.

At block 1304, the storage controller 108 divides the read ahead data size from block 1224 by the stripe size 632 in order to determine the number of full stripes to read into the read data cache 324 from the storage devices 116. The number of full stripes to read into the data cache 324 is the integer quotient of the division. For example, if the read ahead data size is 2.3 MB and the stripe size is 1 MB, two full stripes will be read into the read data cache 324. Flow proceeds to decision block 1308.

At decision block 1308, the storage controller 108 determines if there is a partial stripe remainder from block 1304, or if the read ahead data size is an integer multiple of the stripe size 632. If there is a partial stripe remainder from block 1304, then flow proceeds to block 1312. If there is not a partial stripe remainder from block 1304, then flow ends since the number of stripes to read is determined in block 1304.

At block 1312, the storage controller 108 adds a partial stripe, beginning at the address following the last address 444 of the most recent host read request 332. Flow ends at block 1312.

Although the process steps of the present invention describe the storage controller 108 performing the actions, it is understood by one of ordinary skill in the art that a CPU or processor 312 generally performs these steps. However, in other embodiments, one or more processors, state machines, programmable logic devices, or other devices may perform these steps.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for providing improved sequential read performance in a storage controller, wherein in response to the storage controller receiving a host read request from a host computer, the method comprising:

identifying, by the storage controller, a largest burst length of a plurality of burst lengths in a memory of the storage controller;

determining, by the storage controller, a maximum number of consecutive times between bursts having a value less than a predetermined value, wherein a burst comprises a consecutive group of sequential host read requests from the same host computer, wherein a burst length is the total number of bytes of data in a consecutive group of sequential host read requests from the same host computer;

multiplying, by the storage controller, the largest burst length of the plurality of burst lengths by the maximum number of consecutive times between bursts having a value less than the predetermined value to obtain an effective burst length; and reading into a storage controller cache memory, by the storage controller, at least the effective burst length of data from storage devices coupled to the storage controller.

2. The method of claim 1, wherein the memory stores up to a predetermined number of burst lengths and times between bursts, wherein the predetermined number of burst lengths is equal to the predetermined number of times between bursts.

3. The method of claim 2, wherein prior to identifying the method further comprising:

determining, by the storage controller, that the host read request from the host computer is sequential compared with the immediately previous host read request from the host computer; and determining, by the storage controller, that the number of burst lengths in the plurality of burst lengths is equal to the predetermined number of burst lengths.

4. The method of claim 1, wherein determining the maximum number of consecutive times between bursts having a value less than a predetermined value comprises:
identifying, by the storage controller, the times between bursts having a value less than the predetermined value; and
identifying, by the storage controller, which of the times between bursts having a value less than the predetermined value are consecutive; and
determining the longest consecutive count of the times between bursts having a value less than the predetermined value.

5. The method of claim 1, wherein at least the effective burst length of data from the storage devices comprises at least a remainder of a current stripe, wherein the current stripe is the stripe comprising the last address of the immediately previous host read request from the host computer.

6. The method of claim 5, wherein the storage controller reads in a number of full stripes of data from the storage devices equal to the integer quotient of the effective burst length divided by the stripe size.

7. The method of claim 1, wherein the storage controller maintains an outstanding I/O size for all host read requests received from the host computer, wherein the outstanding I/O size is the current cumulative size of all host read requests received from the host computer that have not yet completed, wherein after the storage controller receives a host read request the storage controller increases the outstanding I/O size by the size of the host read request, wherein the storage controller decreases the outstanding I/O size by the size of the host read request when the host read request completes.

8. The method of claim 7, wherein when a host read request completes and after the storage controller decreases the outstanding I/O size by the read I/O length, if the outstanding I/O size is not equal to zero, the storage controller stores a maximum outstanding I/O size in the memory, wherein the maximum outstanding I/O size is the largest value of outstanding I/O size during the current burst.

9. The method of claim 8, wherein the storage controller stores the maximum outstanding I/O size as the largest burst length of the plurality of burst lengths at a memory location identified by a current burst length pointer, wherein after the storage controller stores the maximum outstanding I/O size in the memory, the storage controller increments the current burst length pointer.

10. A storage controller for providing improved sequential read performance to a host computer, comprising:
a processor; and
a memory, coupled to the processor, the memory comprising a read cache,
wherein in response to the storage controller receiving a burst of host read requests from the host computer, the processor identifies a largest burst length of a plurality of burst lengths in the memory, determines a maximum number of consecutive times between bursts having a value less than a predetermined value, multiplies the largest burst length of the plurality of burst lengths by the maximum number of consecutive times between bursts having a value less than the predetermined value to obtain an effective burst length, and reads into the read cache at least the effective burst length of data from storage devices coupled to the storage controller, wherein a burst comprises a consecutive group of sequential host read requests from the same host computer.

11. The storage controller of claim 10, wherein the memory stores up to a predetermined number of burst lengths and times between bursts, wherein the predetermined number of burst lengths is equal to the predetermined number of times between bursts.

12. The storage controller of claim 11, wherein after the processor identifies the largest burst length of the plurality of burst lengths in the memory, the processor determines that the host read request from the host computer is sequential compared with the immediately previous host read request from the host computer and determines that the number of burst lengths in the plurality of burst lengths is equal to the predetermined number of burst lengths.

13. The storage controller of claim 10, wherein the processor determines the maximum number of consecutive times between bursts having a value less than a predetermined value comprises the processor identifies the times between bursts having a value less than the predetermined value, identifies which of the times between bursts having a value less than the predetermined value are consecutive, and determines the longest consecutive count of the times between bursts having a value less than the predetermined value.

14. The storage controller of claim 10, wherein at least the effective burst length of data from the storage devices comprises at least a remainder of a current stripe, wherein the current stripe is the stripe comprising the last address of the immediately previous host read request from the host computer.

15. The storage controller of claim 14, wherein the storage controller reads in a number of full stripes of data from the storage devices equal to the integer quotient of the effective burst length divided by the stripe size.

16. The storage controller of claim 10, wherein the processor maintains an outstanding I/O size for all host read requests received from the host computer, wherein the outstanding I/O size is the current cumulative size of all read requests received from the host computer that have not yet completed, wherein after the storage controller receives a host read request the processor increases the outstanding I/O size by the size of the host read request, wherein the processor decreases the outstanding I/O size by the size of the host read request when the host read request completes.

17. The storage controller of claim 16, wherein when a host read request completes and after the processor decreases the outstanding I/O size by the read I/O length, if the outstanding I/O size is not equal to zero, the processor stores a maximum outstanding I/O size in the memory, wherein the maximum outstanding I/O size is the largest value of outstanding I/O size during the current burst.

18. The storage controller of claim 17, wherein the processor stores the maximum outstanding I/O size as the largest burst length of the plurality of burst lengths at a memory location identified by a current burst length pointer, wherein after the processor stores the maximum outstanding I/O size in the memory, the processor increments the current burst length pointer.

19. A method for efficiently providing read ahead data to a read cache of a storage controller, comprising:
storing metadata, by the processor, into a memory of the storage controller coupled to the processor, the metadata comprising a predetermined number of sequential read request burst lengths and time between consecutive groups of sequential host read requests;

determining, by a processor of the storage controller, that a consecutive group of host read requests from a host computer coupled to the storage controller is sequential;

identifying, by the processor from the metadata, a largest sequential read request burst length and a maximum number of consecutive times between consecutive groups of sequential read requests having less than a predetermined time value;

calculating, by the processor, an effective burst length from the largest sequential read request burst length and the maximum number of consecutive times between consecutive groups of sequential read requests having less than the predetermined time value; and reading, by the processor, at least the effective burst length of data from storage devices coupled to the storage controller into the read cache.

20. The method for efficiently providing read ahead data to a read cache of a storage controller of claim 19, wherein the processor stores a sequential read request burst length to the memory when a last host read request in a current sequential read request burst completes, wherein the processor stores a time between consecutive groups of sequential read requests to the memory when a last host read request in a group of sequential host read requests is received from the host computer.

* * * * *